United States Patent
Marupaduga et al.

(10) Patent No.: US 11,166,201 B1
(45) Date of Patent: Nov. 2, 2021

(54) DYNAMIC RADIO ACCESS TECHNOLOGY ALLOCATION

(71) Applicant: T-Mobile Innovations LLC, Overland Park, KS (US)

(72) Inventors: Sreekar Marupaduga, Overland Park, KS (US); Rajveen Narendran, Olathe, KS (US)

(73) Assignee: T-Mobile Innovations LLC, Overland Park, KS (US)

(*) Notice: Subject to any disclaimer, the term of this patent is extended or adjusted under 35 U.S.C. 154(b) by 25 days.

(21) Appl. No.: 16/259,351

(22) Filed: Jan. 28, 2019

(51) Int. Cl.
*H04W 36/00* (2009.01)
*H04W 72/08* (2009.01)
*H04W 72/04* (2009.01)
*H04W 36/30* (2009.01)

(52) U.S. Cl.
CPC ....... *H04W 36/0022* (2013.01); *H04W 36/30* (2013.01); *H04W 72/0486* (2013.01); *H04W 72/08* (2013.01)

(58) Field of Classification Search
CPC ............. H04W 36/0022; H04W 36/30; H04W 72/0486; H04W 72/08
See application file for complete search history.

(56) References Cited

U.S. PATENT DOCUMENTS

| | | | | |
|---|---|---|---|---|
| 2009/0154417 A1* | 6/2009 | Wu | ...................... | H04W 72/042 370/329 |
| 2012/0082100 A1* | 4/2012 | Ahmadi | ............ | H04W 72/1215 370/329 |
| 2014/0213277 A1* | 7/2014 | Jang | ...................... | H04W 48/06 455/453 |
| 2014/0335883 A1* | 11/2014 | Ericson | ................. | H04L 5/0048 455/452.2 |
| 2015/0222546 A1* | 8/2015 | Van Phan | ............. | H04L 47/125 709/226 |
| 2018/0049030 A1* | 2/2018 | Manepalli | ............. | H04W 12/08 |
| 2018/0234916 A1* | 8/2018 | Song | ..................... | H04W 48/18 |
| 2019/0373506 A1* | 12/2019 | Harari | ................... | H04W 28/08 |

* cited by examiner

*Primary Examiner* — Yemane Mesfin
*Assistant Examiner* — Henry Baron

(57) ABSTRACT

Methods and systems are provided for dynamically reallocating user devices between two or more radio access technologies based on a current frequency allocation. It is determined that a quantity of user devices using a first radio access technology at a base station is above a threshold. A current frequency allocation is then determined between the first radio access technology and a second radio access technology. Based on the quantity of user devices using the first radio access technology being above the threshold and the current frequency allocation, one or more user devices from the quantity of user devices are reallocated from the first radio access technology to the second radio access technology.

20 Claims, 4 Drawing Sheets

| Recommended Device Allocation | | Frequency Allocation | |
|---|---|---|---|
| First Radio Access Technology | Second Radio Access Technology | First Radio Access Technology | Second Radio Access Technology |
| 75% | 25% | 60 | 60 |
| 60% | 40% | 40 | 60 |
| 60% | 40% | 60 | 40 |
| 80% | 20% | 60 | 60 |
| 90% | 10% | 100 | 60 |

DYNAMIC RADIO ACCESS TECHNOLOGY ALLOCATION

SUMMARY

The present disclosure is directed, in part, to dynamically reallocating user devices from one radio access technology supported by a base station to another radio access technology also supported by that base station. For example, once the quantity of user devices utilizing a first radio access technology exceeds a threshold number, a network component, such as an eNodeB or gNodeB may determine how many and which user devices to reallocate to a different radio access technology at the base station. This determination, in one aspect, is also based on a current frequency allocation between the two radio access technologies. For example, in instances where the frequency allocation may be dynamically modified based on various factors, the network would increase its service quality and efficiency by using the current frequency allocation when determining how to reallocate the user devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
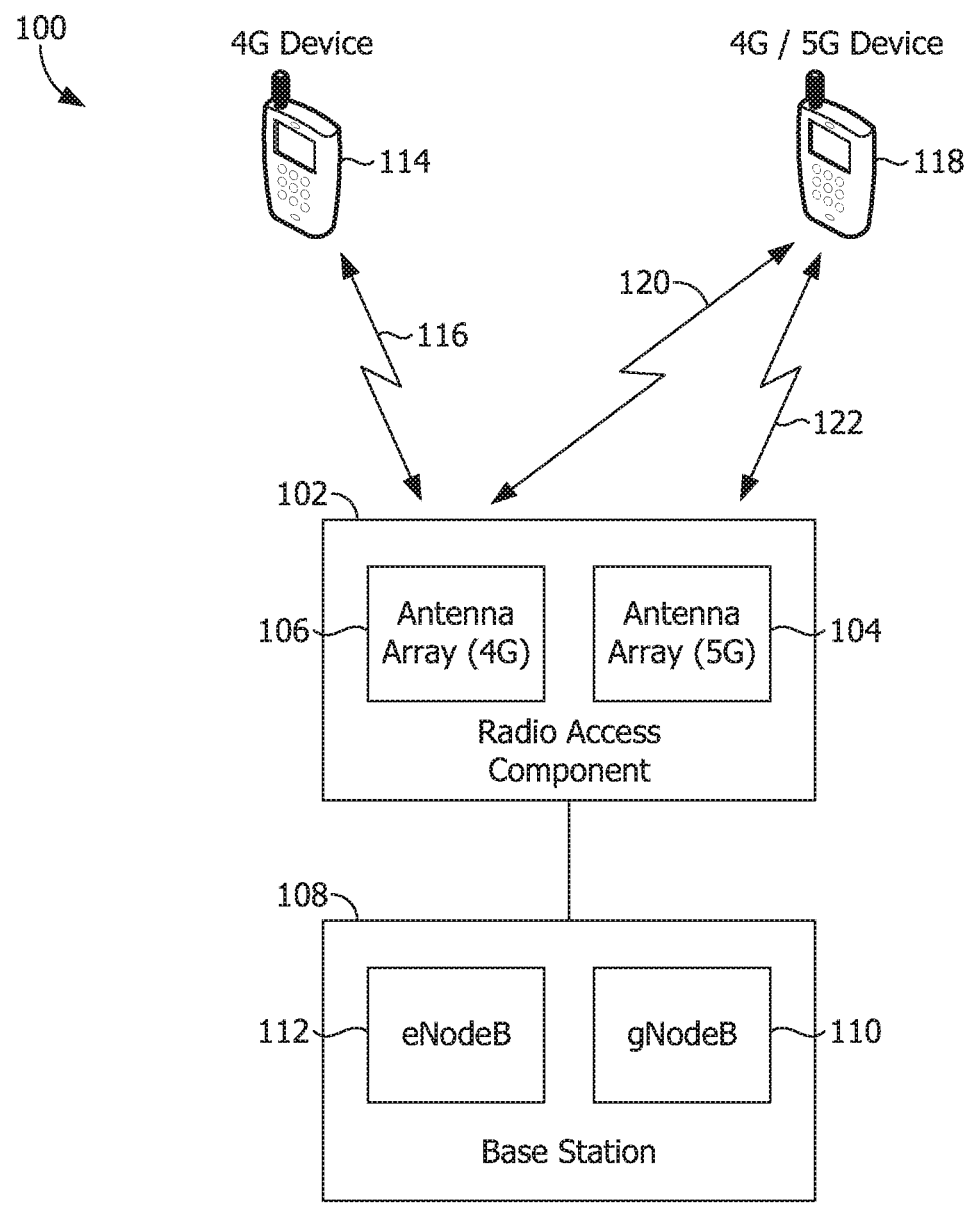
FIG. 1 depicts a diagram of an exemplary network environment suitable for use in implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As new radio access technologies are being deployed, legacy radio access technologies are still being used by many user devices, and as such, there needs to be a way for multiple radio access technologies to be used at the same cell site for different user devices. For instance, as 5G technology is beginning to be deployed, 4G, 3G, and other radio access technologies are still used by many carriers. Additionally, some user devices may not have the capability for 5G, and as such, these legacy user devices need to use 4G, 3G, and other legacy radio access technologies. Allocating radio access technology assignments for any user devices at the cell site, as down the road, many user devices may utilize newer radio access technologies (e.g., 5G) but have the capability to use legacy radio access technologies (e.g., 4G), but a few may still only have the capability to use legacy radio access technologies.

More particularly, there may become a need to reallocate user devices between the two or more radio access technologies utilized at a particular base station. For instance, once the quantity of user devices that use a first radio access technology (e.g., 5G) reaches a maximum allowable quantity (over which quality degradation occurs), the allocation of user devices may be analyzed for reallocation purposes. For instance, some of the user devices may be reallocated to a second radio access technology (e.g., 4G) while others continue utilizing the first radio access technology. Here, any user devices that are reallocated to a different radio access technology would have the capability to access at least two radio access technologies, such as both 4G and 5G.

In certain aspects, methods are provided for dynamically reallocating user devices between two or more radio access technologies (e.g., 4G and 5G) based on the quantity of users using one of the radio access technologies reaching a threshold, and then based on a current frequency allocation between the two or more radio access technologies. Frequency allocation between two or more radio technologies may be dynamic, and as such could change at any time to increase or decrease the available frequency to a particular radio access technology. When the frequency allocation does change at a base station, the change may be recorded in a data store, such as in a table. This table may then be accessed at a later time by a network component, such as an eNodeB or a gNodeB, when the network is determining how to reallocate user devices among the radio access technologies.

There are several advantages to dynamically modifying loading between two or more radio access technologies at a cell site. For instance, it allows better throughput and coverage to those user devices that utilize the radio access technology having a lower loading. It allows not only for a better user experience, but it allows for a higher network efficiency, as the network resources can be better allocated where needed.

In a first aspect, one or more computer-readable media is provided having computer-executable instructions embodied thereon that, when executed, perform a method for dynamically reallocating user devices between two or more radio access technologies based on a current frequency allocation. The method comprises determining that a quantity of user devices using a first radio access technology at a base station is above a threshold, and determining a current frequency allocation between the first radio access technology and a second radio access technology. Further, the method includes, based on the quantity of user devices using the first radio access technology being above the threshold and the current frequency allocation, reallocating one or more user devices from the quantity of user devices from the first radio access technology to the second radio access technology.

In another aspect, a method is provided for dynamically reallocating user devices between two or more radio access technologies based on a current frequency allocation. The method comprises determining that a quantity of user devices in a first set of user devices exceeds a predetermined threshold, wherein the quantity of user devices in the first set of user devices utilizes a first radio access technology for communicating with a base station, and determining a current frequency allocation between the first radio access technology and a second radio access technology used by the base station. Further, the method comprises, based on the current frequency allocation, reallocating at least one of the quantity of user devices to the second radio access technology.

In yet another aspect, a system is provided for dynamically reallocating user devices between two or more radio access technologies based on a current frequency allocation. The system comprises a processor and one or more computer storage hardware devices storing computer-usable instructions that, when used by the processor, cause the processor to perform a method. The method includes determining that a quantity of user devices assigned to use a first radio access technology at a base station is nearing a maximum allowed quantity, and accessing a data store to determine, based on a current frequency allocation between the first radio access technology and a second radio access technology, a recommended loading split of user devices between those using the first radio access technology and those using the second radio access technology. Further, the method incudes reallocating one or more user devices from the first radio access technology to the second radio access technology.

Throughout the description of embodiments of the present invention, several acronyms and shorthand notations are used to aid the understanding of certain concepts pertaining to the associated methods, systems, and computer-readable media. These acronyms and shorthand notations are solely intended for the purpose of providing an easy methodology of communicating the ideas expressed herein and are in no way meant to limit the scope of the present invention.

Further, various technical terms are used throughout this description. An illustrative resource that fleshes out various aspects of these terms can be found in Newton's Telecom Dictionary, 31st Edition (2018).

Embodiments of our technology may be embodied as, among other things, a method, system, or computer-program product. Accordingly, the embodiments may take the form of a hardware embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Referring to FIG. 1, an exemplary network environment is provided in which implementations of the present disclosure may be employed. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

FIG. 1 illustrates a 4G device 114 and a 4G/5G device 118. While the terms 4G and 5G are used herein, these refer to any one of the many radio access technologies currently available or that may be deployed and available in the future. 4G and 5G are used simply as examples, and are not intended to limit aspects described herein. 4G device 114 includes a communication link 116 to the radio access component 102, whereas the 4G/5G device 118 includes communication links 120 and 122 providing communication to the radio access component 102. Multiple communication links are illustrated for 4G/5G device 118, as it is capable of communicating with multiple radio access technologies (e.g., 4G and 5G).

In network environment 100, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices. In some aspects, user devices 114 and 118 can correspond to computing device 500 in FIG. 5. Thus, a user device can include, for example, a display(s), a power source(s) (e.g., a battery), a data store(s), a speaker(s), memory, a buffer(s), a radio(s), and the like. In some implementations, user devices 114 and 118 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

The radio of a cell site may include multiple antennas, and in some instances, may include a first set of antennas for a first radio access technology and a second set of antennas for a second radio access technology. As such, as shown here, antenna array (4G) 106 includes the antennas for transmitting/receiving data using 4G technology, and antenna array (5G) 104 includes the antennas for transmitting/receiving data using 5G technology. Typically, when a cell site (which typically includes a radio access component and a base station) is deployed, half or 50% of channel bandwidth is allocated to one radio access technology, and the other half or 50% of channel bandwidth is allocated to the other radio access technology. Radio access component 102 is communicatively coupled to base station 108, which includes an eNodeB 112 for 4G communications and a gNodeB 110 for 5G communications.

Communications links, such as the wireless telecommunication links shown in FIG. 1 between each of the user devices and the radio access component 102, may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short-range and long-range as different categories, or types, of connections (i.e., a primary connection and a secondary connection). A short-range connection may include a Wi-Fi connection to a device (e.g., mobile hotspot) that provides access to a communications network, such as a WLAN connection using 802.11 protocol. A short-range connection may also utilize mobile broadband, which provides wireless Internet access using a mobile broadband router. One example of mobile broadband technology is Evolution Data Optimized, or EVDO. EVDO relies on a signal from a wireless tower rather than a physical connection like a phone line or cable. An EVDO modem receives the signal and allows a user to connect to the Internet. Another example of mobile broadband is HSPA. A long-range connection may include a connection using one or more of CDMA, GPRS, GSM, TDMA, 802.16, and the like.

Figure 2:
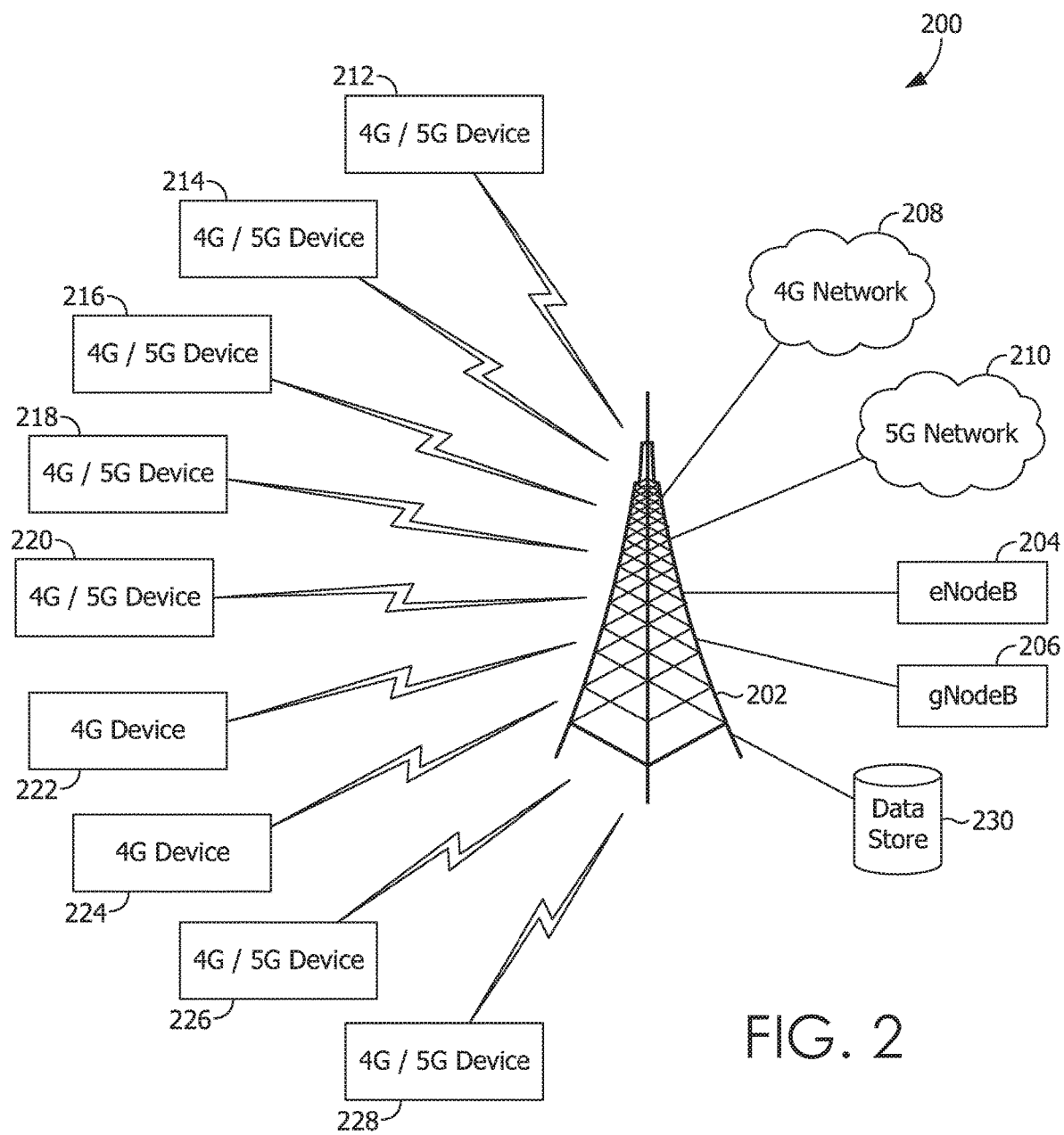
FIG. 2 illustrates a diagram of an exemplary network environment suitable for use in implementations of the present disclosure.

Turning now to FIG. 2, another exemplary networking environment suitable for use in aspects discussed herein is provided. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 includes multiple user devices, including 4G devices 222 and 224 and 4G/5G devices 212, 214, 216, 218, 220, 226, and 228. Network environment 200 further includes cell site 202, 4G network 208, 5G network 210, eNodeB 204, gNodeB 206, and data store 230. In network environment 200, user devices may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, an access point, and any combination of these delineated devices.

Figure 5:
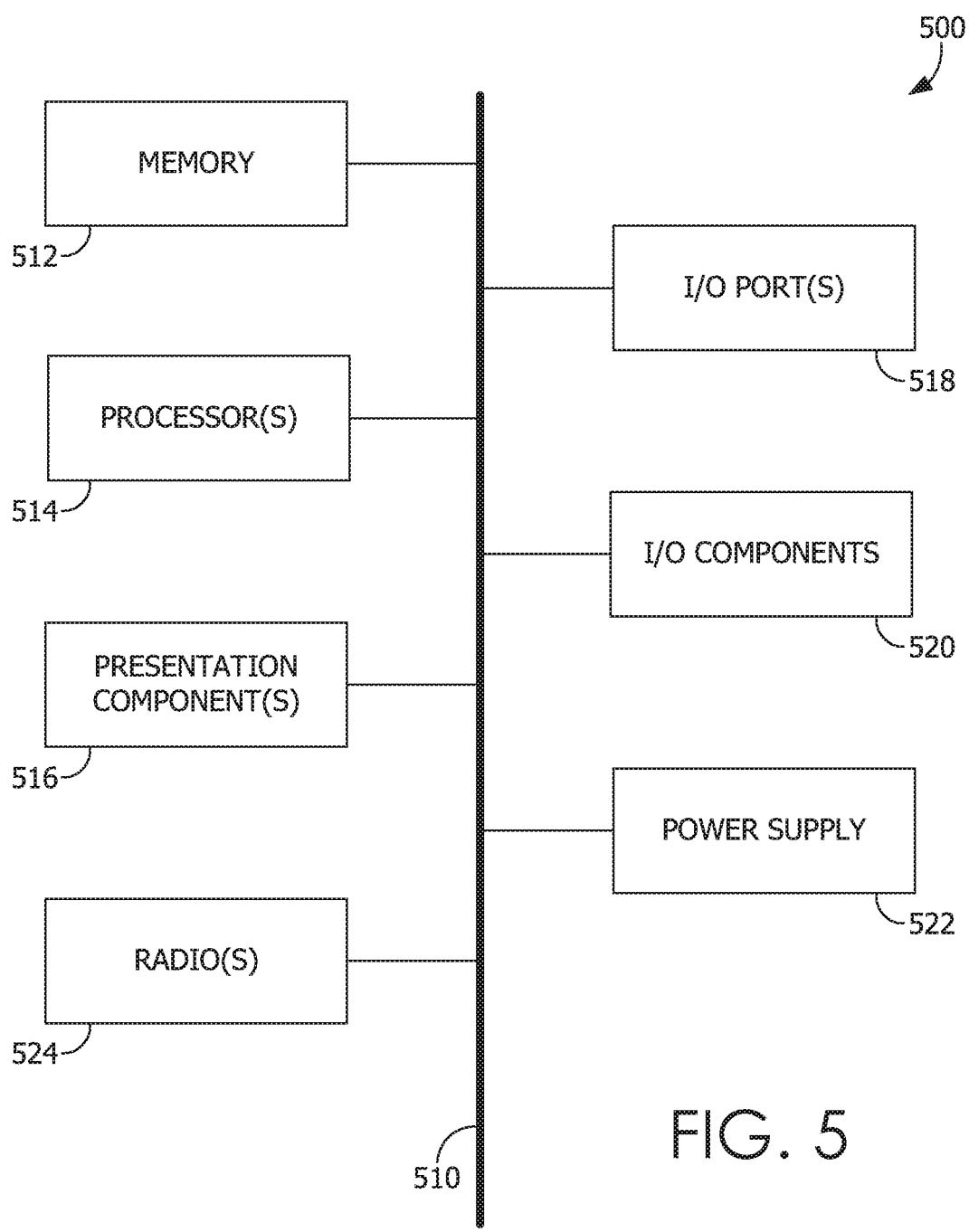
FIG. 5 depicts an exemplary computing environment suitable for use in implementation of the present disclosure.

In some aspects, the user devices shown in FIG. 2 can correspond to computing device 500 in FIG. 5. Thus, a user device can include, for example, a display(s), a power source(s) (e.g., a battery), a data store(s), a speaker(s), memory, a buffer(s), a radio(s), and the like. In some implementations, the user devices shown in FIG. 2 comprise a wireless or mobile device with which a wireless telecommunication network(s) can be utilized for communication (e.g., voice and/or data communication). In this regard, the user device can be any mobile computing device that communicates by way of a wireless network, for example, a 3G, 4G, 5G, LTE, CDMA, or any other type of network.

In some cases, the user devices in network environment 200 can optionally utilize 4G network 208 and 5G network 210, through cell site 202, to communicate with other computing devices (e.g., a mobile device(s), a server(s), a personal computer(s), etc.). 4G network 208 and 5G network 210 may be telecommunications networks, or a portion thereof. A telecommunications network might include an array of devices or components (e.g., one or more base stations), some of which are not shown. Those devices or components may form network environments similar to what is shown in FIG. 2 and may also perform methods in accordance with the present disclosure. Components such as terminals, links, and nodes (as well as other components) can provide connectivity in various implementations. 4G network 208 and 5G network 210 can include multiple networks, as well as be a network of networks, but is shown in more simple form so as to not obscure other aspects of the present disclosure.

4G network 208 and 5G network 210 can be part of a telecommunication network that connects subscribers to their immediate service provider. In some instances, 4G network 208 and 5G network 210 can be associated with a telecommunications provider that provides services (e.g., LTE, 5G) to user devices, such as user devices 212-228. For example, 4G network 208 and 5G network 210 may provide voice services to user devices or corresponding users that are registered or subscribed to utilize the services provided by a telecommunications provider. While labeled as 4G and 5G networks, 4G network 208 and 5G network 210 can comprise any communication network providing voice and/or data service(s), such as, for example, a 1× circuit voice, a 3G network (e.g., CDMA, CDMA2000, WCDMA, GSM, UMTS), a 4G network (WiMAX, LTE, HSDPA), a 5G network, or a combination thereof.

As shown in network environment 200, which is provided for exemplary purposes only, there are nine user devices (212, 214, 216, 218, 220, 222, 224, 226, and 228). User devices 212, 214, 216, 218, 220, 226, and 228 are 4G/5G devices, while user devices 222 and 224 are 4G devices. While 4G and 5G are used in FIG. 2, they are used solely for exemplary purposes. Any other radio access technology is contemplated to be used here, and 4G/5G are provided only as non-limiting examples. As mentioned, 4G/5G devices (212, 214, 216, 218, 220, 226, and 228) are user devices that are capable of utilizing at least two radio access technologies, which here are 4G and 5G. These devices are those that can be reallocated from 4G to 5G or vice versa based on their dual capabilities. While not shown in FIG. 2, it is noted that not all of the user devices that are capable of communicating via the first radio access technology (e.g., 5G) may also have the capability to communicate via a second radio access technology. Some may only have the capability to communicate via the first radio access technology. Here, the network would know that those devices could not be selected to be reallocated to a different radio access technology.

Figures 3, 4:
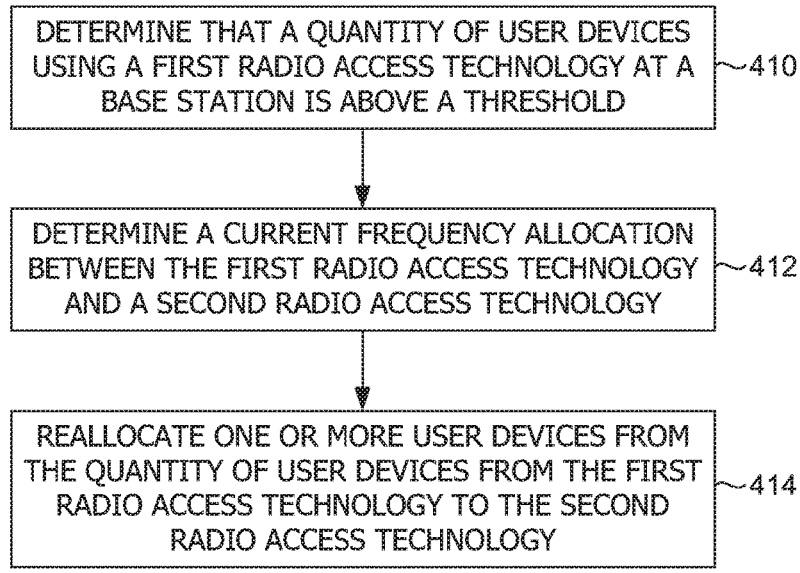
FIG. 3 illustrates a table correlating frequency allocation with a recommended device allocation between two radio access technologies, in accordance with implementations of the present disclosure.
FIG. 4 depicts a flow diagram of an exemplary method for dynamically reallocating user devices between two or more radio access technologies based on a current frequency allocation, in accordance with implementations of the present disclosure.

In one embodiment, the quantity of user devices (e.g., user devices 212, 214, 216, 218, 220, 226, and 228) utilizing a first radio access technology (e.g., 5G) may exceed a predetermined threshold of user devices. This being the trigger for reallocation, a network component, such as the eNodeB 204 or gNodeB 206 may access the data store 230, for example, to determine a recommended device allocation between a first and second radio access technology, which could be based on a current bandwidth allocation between the first and second radio access technology. FIG. 3, which is discussed below, provides an example of a lookup table that could be stored in data store 230 and used to determine how to reallocate user devices from one radio access technology to another. While just nine total user devices are illustrated in FIG. 2, seven of those being able to communicate via a first radio access technology, in many instances, the quantity would be higher or lower. FIG. 2 is merely illustrative of a cell site and how the reallocation would work.

Turning now to FIG. 3, FIG. 3 illustrates a table 300 correlating frequency allocation with a recommended device allocation between two radio access technologies, in accordance with implementations of the present disclosure. In embodiments, this table 300 could be stored in the network, such as in date store 230 of FIG. 2, so that network components can access the table 300 when determining if/how to reallocate user devices between two or more radio access networks.

Looking at table 300, in the first exemplary line, when the frequency allocation is split between the first and second radio access technologies 60/60 (where these numbers are represented in MHz), the recommended device allocation is 75% of user devices at the cell site utilizing the first radio access technology and 25% of the user devices at the cell site utilizing the second radio access technology. These percentages could be determined in real-time, such as when a network component accesses the table for this information, or could be predetermined. It also could be updated on a periodic basis, so not in real-time, but also not static. Instead, these values could be periodically updated by the network (e.g., network operator). Looking at the second line, when 40 MHz is allocated to the first radio access technology and 60 MHz is allocated to the second radio access technology, the device allocation may be 60% to the first radio access technology and 40% to the second radio access technology. As such, if the device allocation was 95% to the first radio access technology and 5% to the second, this allocation would be modified to 60%/40% instead of the previous 95%/5%. While five different frequency allocation scenarios with corresponding recommended device allocations are illustrated in the table 300 of FIG. 3, more or less could be included in a table. For instance, there could be many more, such as tens, hundreds, or thousands, of frequency allocation scenarios where each could have its own recommended device allocation. In that instance, the table would be much larger. FIG. 3 is a non-limiting example of a table to explain aspects provided herein.

FIG. 4 depicts a flow diagram of an exemplary method 400 for dynamically reallocating user devices between two or more radio access technologies based on a current frequency allocation, in accordance with implementations of the present disclosure. While we give examples herein of the first radio access technology being 5G and the second being 4G, these are simply examples not meant to limit this disclosure. The first and second radio access technologies could represent any other radio access technologies available at a base station. At block 410, it is determined that a quantity of user devices using a first radio access technology at a base station is above a threshold, where the threshold could be predetermined or determined in real-time, such as based on network conditions at that time. The threshold may be determined by a point where quality degradation (e.g., lower quality communications) would occur if any more user devices utilize a particular radio access technology at that base station. In one aspect, one or more of the quantity of user devices using the first radio access technology are capable of communicating by way of the first and second radio access technologies, but at least one may be capable of communicating using only the first radio access technology and not the second radio access technology.

At block 412, a current frequency allocation between the first and second radio access technologies utilized at that base station is determined. In one aspect, this determination could be made by a network component (e.g., eNodeB or gNodeB) by accessing a lookup table, such as one stored in a data store, to determine a recommended loading split between the first and second radio access technologies based on the current frequency allocation. FIG. 3 discussed above provides details on the lookup table. The lookup table, for example, may include predetermined values of the recommended loading, or these values could be determined in real time based on, for example, current network conditions. The current frequency allocation in the lookup table may be dynamically determined and based on loading and/or network conditions.

At block 414, one or more user devices from the quantity of devices using the first radio access technology are reallocated, or moved, to the second radio access technology. This reallocation may be based on the quantity of user devices using the first radio access technology being above a threshold and the current frequency allocation. Not only could the network component (e.g., eNodeB or gNodeB) determine how many user devices need to be moved from the first to the second radio access technology, but it may also determine which devices should be switched, such as by the capabilities each device has with regard to radio access technologies. For instance, if one of the user devices is capable of using only the first radio access technology but not the second radio access technology, that user device could not be one that is switched from the first to the second radio access technology. In one aspect, a redirect message may be communicated to each user device that will be switching from the first to the second radio access technology.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, and power supply 514. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 508 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. One or more non-transitory computer-readable media having computer-executable instructions embodied thereon that, when executed, perform a method for dynamically reallocating user devices between two or more radio access technologies at a particular base station, the method comprising:
  determining that a quantity of user devices using a first radio access technology at the particular base station is above a threshold;
  determining a current frequency allocation between the first radio access technology and a second radio access technology at the particular base station; and
  based on the quantity of user devices using the first radio access technology being above the threshold and a recommended device allocation for the current frequency allocation, reallocating one or more user devices from the quantity of user devices using the first radio access technology from the first radio access technology to the second radio access technology, wherein the one or more user devices that are reallocated are capable of using the first radio access technology and the second radio access technology.

2. The one or more non-transitory computer-readable media of claim 1, wherein the first radio access technology is 5G and the second radio access technology is 4G.

3. The one or more non-transitory computer-readable media of claim 1, wherein determining the current frequency allocation further comprises accessing a lookup table to determine a recommended loading split between the first radio access technology and the second radio access technology.

4. The one or more non-transitory computer-readable media of claim 1, further comprising communicating a redirect message to the one or more user devices that are reallocated from the first radio access technology to the second radio access technology.

5. The one or more non-transitory computer-readable media of claim 3, wherein the lookup table includes predetermined values of the recommended loading split between the first radio access technology and the second radio access technology.

6. The one or more non-transitory computer-readable media of claim 3, wherein the lookup table includes values of the recommended loading split between the first radio access technology and the second radio access technology that are computed in real-time.

7. The one or more non-transitory computer-readable media of claim 1, wherein the current frequency allocation between the first radio access technology and the second radio access technology is dynamically determined.

8. The one or more non-transitory computer-readable media of claim 1, wherein the threshold is at least a portion of the quantity of user devices using the first radio access technology above which lower quality communications are produced if any more user devices utilize the first radio access technology at the particular base station.

9. The one or more non-transitory computer-readable media of claim 1, wherein at least one user device of the quantity of user devices is capable of using the first radio access technology and not the second radio access technology.

10. A method for dynamically reallocating user devices between two or more radio access technologies at a particular base station, the method comprising:
    determining that a quantity of user devices in a first set of user devices using a first radio access technology at the particular base station exceeds a predetermined threshold;
    determining a current frequency allocation between the first radio access technology and a second radio access technology at the particular base station; and
    based on the quantity of user devices in the first set of user devices using the first radio access technology being above the predetermined threshold and a recommended device allocation for the current frequency allocation, reallocating at least one user device in the first set of user devices to the second radio access technology, wherein the at least one user device is capable of using the first radio access technology and the second radio access technology.

11. The method of claim 10, wherein the first radio access technology is 5G.

12. The method of claim 10, wherein the current frequency allocation between the first radio access technology and the second radio access technology is dynamically modifiable based on a current loading at the particular base station.

13. The method of claim 10, wherein one or more user devices of the quantity of user devices in the first set of user devices are capable of using the first radio access technology and not the second radio access technology.

14. The method of claim 10, wherein determining the current frequency allocation further comprises accessing a lookup table to determine a recommended loading split between the first radio access technology and the second radio access technology based on the current frequency allocation.

15. A system for dynamically reallocating user devices between two or more radio access technologies based on a current frequency allocation, the system comprising:
    a processor; and
    one or more computer storage hardware devices storing computer-usable instructions that, when used by the processor, cause the processor to:
    determine that a quantity of user devices assigned to use a first radio access technology at a particular base station is nearing a maximum allowed quantity;
    access a data store to determine, based on a current frequency allocation between the first radio access technology and a second radio access technology, a recommended loading split of user devices between those using the first radio access technology and those using the second radio access technology at the particular base station; and
    reallocate one or more user devices from the quantity of user devices assigned to use the first radio access technology from the first radio access technology to the second radio access technology, wherein the one or more devices that are reallocated are capable of using the first radio access technology and the second radio access technology.

16. The system of claim 15, wherein the current frequency allocation between the first radio access technology and the second radio access technology at the particular base station is dynamically modifiable based on a current loading at the base station.

17. The system of claim 15, wherein the processor is further caused to communicate a redirect message to the one or more user devices that are to be reallocated from the first radio access technology to the second radio access technology.

18. The method of claim 15, wherein the first radio access technology is 5G.

19. The method of claim 15, wherein the second radio access technology is 4G.

20. The method of claim 10, wherein the second radio access technology is 4G.

* * * * *